US012735991B2

(12) United States Patent
Terwilliger et al.

(10) Patent No.: US 12,735,991 B2
(45) Date of Patent: Sep. 15, 2026

(54) HYBRID GAS TURBOFAN POWERED IDLE DESCENT MODE

(71) Applicant: RTX Corporation, Farmington, CT (US)

(72) Inventors: Neil Terwilliger, Cheshire, CT (US); Daniel Bernard Kupratis, Wallingford, CT (US); Michael Romero, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/033,023

(22) Filed: Jan. 21, 2025

(65) Prior Publication Data

US 2025/0163823 A1 May 22, 2025

Related U.S. Application Data

(63) Continuation of application No. 16/431,245, filed on Jun. 4, 2019, now abandoned.

(60) Provisional application No. 62/719,375, filed on Aug. 17, 2018, provisional application No. 62/686,853, filed on Jun. 19, 2018, provisional application No. 62/680,843, filed on Jun. 5, 2018.

(51) Int. Cl.

| | |
|---|---|
| ***F01D 15/10*** | (2006.01) |
| ***F02C 7/268*** | (2006.01) |
| ***F02C 7/277*** | (2006.01) |
| ***F02C 9/26*** | (2006.01) |
| *B64D 27/02* | (2006.01) |

(52) U.S. Cl.

CPC .............. *F01D 15/10* (2013.01); *F02C 7/268* (2013.01); *F02C 7/277* (2013.01); *F02C 9/26* (2013.01); *B64D 27/026* (2024.01); *F05D 2220/50* (2013.01); *F05D 2220/76* (2013.01)

(58) Field of Classification Search

CPC .. F02C 7/277; F02C 7/268; F02C 7/32; F02C 7/36; F02C 7/275; F02C 6/08; F02C 6/02; F02C 9/26; B64D 2027/026; F01D 15/10

See application file for complete search history.

(56) References Cited

U.S. PATENT DOCUMENTS

| | | | |
|---|---|---|---|
| 3,965,673 | A | 6/1976 | Friedrich |
| 4,541,237 | A | 9/1985 | Dickey |

(Continued)

FOREIGN PATENT DOCUMENTS

| | | | |
|---|---|---|---|
| EP | 1728990 | A2 | 12/2006 |
| EP | 2452876 | A2 | 5/2012 |

OTHER PUBLICATIONS

Extended European Search Report for EP Application No. 19191061.1, dated Mar. 19, 2020, 14 pages.

(Continued)

*Primary Examiner* — Thomas P Burke

(74) *Attorney, Agent, or Firm* — Kinney & Lange, P.A.

(57) ABSTRACT

A method of operating an aircraft hybrid gas turbofan during an idle mode of operation includes reducing a fuel flow to a primary gas turbine engine and boosting a high spool of the primary gas turbine engine using a secondary gas turbine engine via a first power linkage connecting the primary and secondary gas turbine engines, such that a net fuel reduction is achieved. The net fuel reduction accounts for fuel flow to the primary gas turbine engine and fuel flow to the secondary gas turbine engine.

12 Claims, 6 Drawing Sheets

(56) References Cited

U.S. PATENT DOCUMENTS 6,971,241 B2 12/2005 Critchley et al.
8,205,429 B2 6/2012 Wollenweber
9,099,882 B2 8/2015 Lammers et al.
9,410,478 B2 8/2016 Loebig et al.
9,429,077 B2 8/2016 Morgan
2003/0131585 A1* 7/2003 Saito ......................... F02K 3/11 60/39.15
2006/0032234 A1* 2/2006 Thompson ............. F02C 7/277 60/787
2009/0106978 A1* 4/2009 Wollenweber ............ F02C 9/42 60/39.15
2012/0119020 A1* 5/2012 Burns ....................... F02C 7/36 244/58
2016/0061117 A1* 3/2016 Emmet ..................... F02C 3/04 415/148
2017/0037775 A1* 2/2017 Jones ..................... B64D 41/00
2017/0226934 A1* 8/2017 Robic ....................... F02C 7/32
2017/0369180 A1* 12/2017 Jones ...................... F01D 15/08
2018/0003072 A1 1/2018 Lents et al.
2018/0201386 A1* 7/2018 Strauss ................... B64C 27/12
2018/0354632 A1* 12/2018 Hon ....................... B64D 27/33

OTHER PUBLICATIONS

Communication Pursuant to Article 94(3) EPC for EP Application No. 19191061.1, dated Sep. 13, 2021, 6 pages.

Lukovnikov , "NPL", A. V. Lukovnikov et al., "The Hybrid Propulsion Systems for the Advanced Aircraft", from <https://www.icas.org/ICAS_ARCHIVE/ICAS2014/data/papers/014_0820_paper.pdf, Mar. 10, 2020, pp. 15, Mar. 19, 2020.

* cited by examiner

HYBRID GAS TURBOFAN POWERED IDLE DESCENT MODE

CROSS-REFERENCE TO RELATED APPLICATION(S)

This application is a continuation application of U.S. application Ser. No. 16/431,245, filed Jun. 4, 2019 for "Hybrid Gas Turbofan Powered Sub-Idle Descent mode" by N. Terwilliger, D. Kupratis, and M. Romero which claims the benefit of U.S. Provisional Application No. 62/719,375 filed Aug. 17, 2018 for "Hybrid Gas Turbofan Powered Sub-Idle Descent mode" by N. Terwilliger, D. Kupratis, and M. Romero, which is herein incorporated by reference. U.S. Provisional Application Nos. 62/686,853 and 62/680,843, filed Jun. 19, 2018 and Jun. 5, 2018, respectively, are also incorporated by reference.

BACKGROUND

The present disclosure relates generally to multiple engine gas turbine systems, and more particularly to a power-assist system in which power is transferred between an auxiliary power unit (APU) and a high spool of a primary engine.

Conventional aircraft turbine engines remain on during descent and idle to provide pressurized cabin air and avoid the need for in-flight restart. The idle mode requires fuel burn sufficient to ensure a self-sustaining engine. A need exists to reduce the amount of fuel needed during idle to improve engine economics.

SUMMARY

A method of operating an aircraft hybrid gas turbofan during an idle mode of operation includes reducing a fuel flow to a primary gas turbine engine and boosting a high spool of the primary gas turbine engine using a secondary gas turbine engine via a first power linkage connecting the primary and secondary gas turbine engines, such that a net fuel reduction is achieved. The net fuel reduction accounts for fuel flow to the primary gas turbine engine and fuel flow to the secondary gas turbine engine.

In another aspect, a method of operating an aircraft hybrid gas turbofan includes providing supplemental power to either a primary gas turbine engine or a secondary gas turbine engine-the primary gas turbine engine being a propulsion engine and the secondary gas turbine engine being an auxiliary power unit (APU). Supplemental power is provided to the primary gas turbine engine by the APU, and supplemental power is provided to the APU by the primary gas turbine engine. The method further includes reducing a fuel flow to the primary gas turbine engine when supplemental power is provided to the primary gas turbine engine by the APU such that a net fuel reduction is achieved. The net fuel reduction accounts for fuel flow to the primary gas turbine engine and fuel flow to the APU.

In yet another aspect, an aircraft hybrid gas turbofan includes a primary gas turbine engine, which is a propulsion engine having a high spool; a secondary gas turbine engine, which is an auxiliary power unit (APU); and a power linkage between the high spool of the primary gas turbine engine and the APU.

In yet another aspect, a method of operating an aircraft hybrid gas turbofan includes providing supplemental power to a primary gas turbine engine from a secondary gas turbine engine-the primary gas turbine engine being a propulsion engine and the secondary gas turbine engine being an auxiliary power unit (APU)-and reducing a response time of the primary gas turbine engine for spooling up when additional thrust output is needed.

The present summary is provided only by way of example, and not limitation. Other aspects of the present disclosure will be appreciated in view of the entirety of the present disclosure, including the entire text, claims, and accompanying figures.

Figure 1:
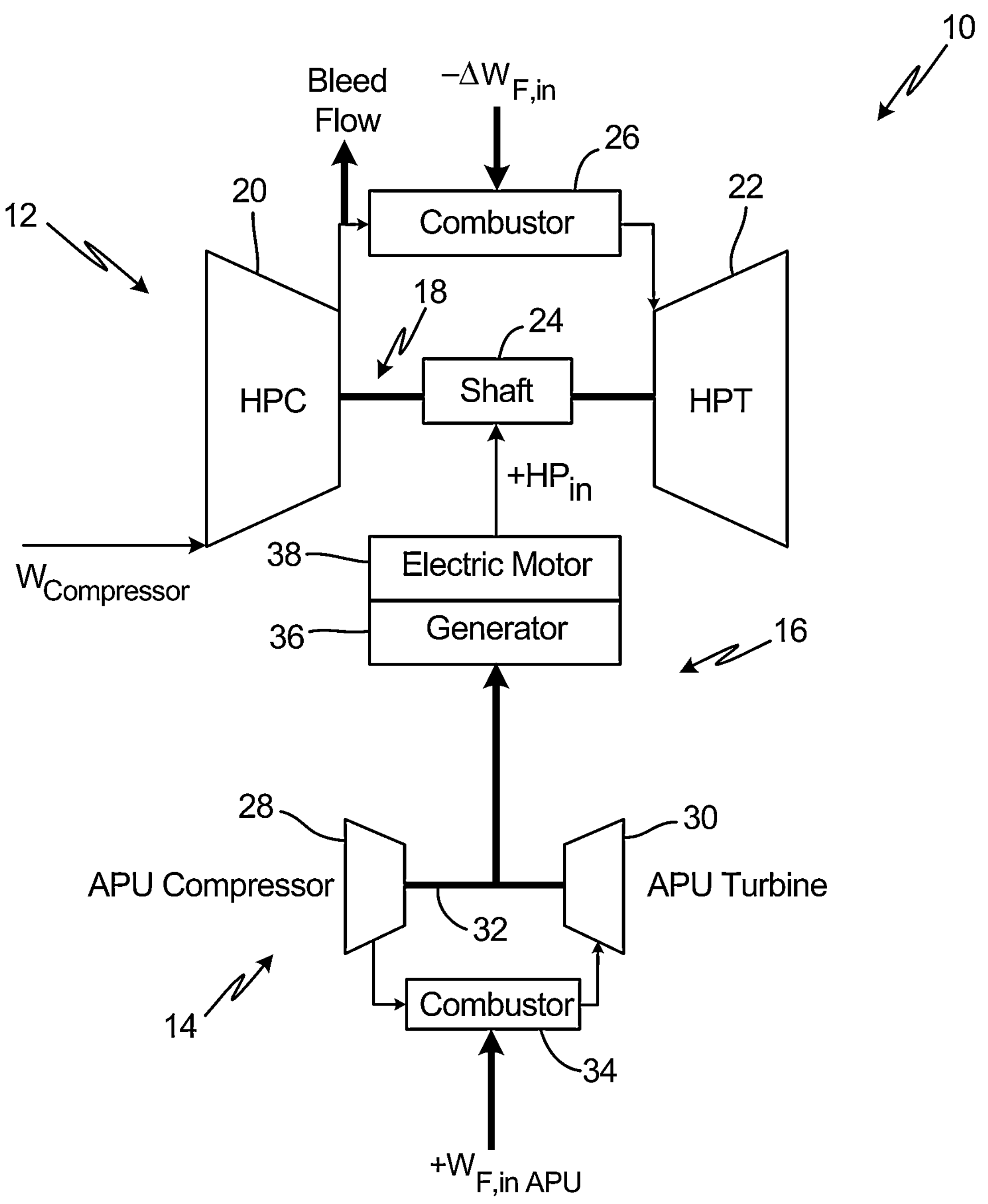
FIG. 1 is a schematic diagram of one embodiment of a gas turbine engine power assist system in which a secondary gas turbine engine boosts power to a primary gas turbine engine of an aircraft through a power linkage including a generator and motor.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure provides several modes of providing power assist to a high spool of a primary gas turbine engine to enable a reduced fuel flow during an idle mode of operation, and particularly, during descent of an aircraft. Primary gas turbine engines on an aircraft are kept on during descent to maintain minimum air pressurization needed for an aircraft environmental control system (ECS) and to remain available for operation if needed. Significant fuel flow inputs are necessary to keep an engine on during descent. The engine can remain on with minimum pressurization maintained at a reduced fuel flow if the power to the engine is supplemented. The present disclosure is directed to operation of an aircraft hybrid gas turbofan in which a secondary gas turbine engine, such as an auxiliary power unit (APU), is used to provide supplemental power to the primary gas turbine engine to provide a sub-idle descent mode of operation. In one mode, the APU drives a generator, which supplies electrical energy to a motor used to boost power to the high spool of the primary engine. In another mode, the APU provides compressed air into a turbine section of the primary engine to provide high spool torque. In yet another mode, the APU provides both electric power to boost the high spool and compressed air to the turbine section to increase high spool torque. While fuel input is required to power the APU, each power assist mode can result in a net fuel savings. Additionally, the same architecture provided for supplementing power to the primary engine via generator/motor can be used in reverse for supplementing power to the APU. When the primary engine is operating at high power, the power transfer can be reversed, with the high spool (or low spool) on the primary engine boosting a shaft of the APU via a generator and motor. Such power transfer can improve APU efficiency, such that the APU can remain on or spooled up during flight and available for service on demand.

FIG. 1 is a schematic diagram of one embodiment of a gas turbine engine power assist system 10, which includes primary engine 12 and secondary engine 14. Primary and secondary engines 12 and 14 are gas turbine engines. In some embodiments, primary engine 12 can be an aircraft propulsion engine, and secondary engine 14 can be an aircraft APU. Primary engine 12 and secondary engine 14 are interconnected by power linkage 16 through which power can be transferred between primary engine 12 and secondary engine 14.

Primary engine 12 can be a multi-spool engine, having at least a low pressure spool and high pressure spool as known in the art. For simplicity, only high pressure spool 18 is illustrated. High pressure spool 18 includes high pressure compressor (HPC) 20 and high pressure turbine (HPT) 22 mounted on shaft 24. Although not illustrated, it will be understood by one of ordinary skill in the art that the low pressure spool can carry a fan, low pressure compressor, and low pressure turbine. Primary engine 12 is a Brayton cycle engine wherein a mixture of fuel and compressed air from HPC 20 is ignited in combustor 26 to drive rotation of HPT 22 and thereby HPC 20 via shaft 24.

Like primary engine 12, secondary engine 14 can be a gas turbine engine. As illustrated, secondary engine 14 includes compressor 28 and turbine 30 mounted on shaft 32. A mixture of fuel and compressed air from compressor 28 is ignited in combustor 34 to drive turbine 30 and thereby compressor 28 via shaft 32. In some embodiments, secondary engine 14 can additionally include a power turbine (not shown) mounted on a power shaft, which is rotationally independent from shaft 32. Secondary engine 14 can provide power for a range of peripheral aircraft functions independent from propulsion or from the operation of primary engine 12. For example, secondary engine 14 can be used for power generation, for cabin air circulation, and/or to drive mechanical actuation of aircraft components. Secondary engine 14 can have a number of configurations or cycles (e.g., wankel cycle) and is not limited to the gas turbine engine depicted.

Primary engine 12 and secondary engine 14 are connected by power linkage 16, which includes generator 36 and motor 38. When primary engine 12 is operating in an idle mode, fuel flow to primary engine 12 can be reduced and power extracted from secondary engine 14 can be provided to primary engine 12 via power linkage 16 to boost high pressure spool 18. As used herein, an idle mode of operation refers to a rotational speed of the high spool 18 that is greater than the minimum rotational speed required to achieve starting of the engine and is less than the rotational speed (N2) associated with the maximum idle thrust of primary engine 12 set by the airframer. Idle is based on the engine's minimum limiting factor (e.g., minimum N1, N2, fuel air ratio, ECS bleed, etc.). Power assist system 10 can be used to supplement power to primary engine 12 during descent of the aircraft as well as during ground idle and other flight idle operations. As illustrated, rotational energy of shaft 32 of secondary engine 14 is transferred to shaft 24 on high pressure spool 18 of primary engine 12 via generator 36 and motor 38. In some embodiments, generator 36 and motor 38 can be a combined motor-generator capable of operating in a reverse direction (i.e., transferring power from primary engine 12 to secondary engine 14). In other embodiments, generator 36 and motor 38 can be separate components coupled via an electrical connection (not shown). Generator 36 is a rotary generator driven by shaft 32 to produce electrical power, which is provided to motor 38. Motor 38, in turn, uses the electrical power to drive shaft 24 of high pressure spool 18. In alternative embodiments, the power shaft (not shown) of secondary engine 14 can be used to boost high pressure spool 18 of primary engine 12 via generator 36 and motor 38.

As illustrated, during operation of power assist system 10, fuel flow into combustor 26 of primary engine 12 is reduced, as indicated by $-\Delta W_{F,in}$, in, which represents a change in fuel flow from a conventional idle mode (i.e., idle without power assist). Fuel flow input ($+W_{F,\ in\ APU}$) to secondary engine 14 is required to operate secondary engine 14. Secondary engine 14 provides supplementary horsepower ($+HP_{in}$) to primary engine 12 via generator 36/motor 38. Supplemental power provided to primary engine 12 can cause high pressure spool 18 to rotate at a higher speed than a conventional idle speed. The increased speed of high pressure spool 18 can improve operation safety (i.e., improve compressor 20 operating stability margin) of primary engine 12 and response time from idle, allowing for a faster spool up time (time required to accelerate and increase fuel flow rate) if additional thrust output by engine 12 becomes necessary. Although fuel flow in secondary engine 14 is increased, a net fuel reduction can be achieved, as is discussed further with respect to FIGS. 4-6.

In some embodiments, the architecture of power linkage 16 can be used in reverse for boosting power to secondary engine 14. In some operations, it may be beneficial to have a hybrid electric configuration in which an APU (secondary engine 14) is available on an as-needed basis throughout an entire flight. As such, it may be desired to run APU 14 at idle during the entire flight or keep APU 14 spooled up, but off, to ensure APU 14 is ready when needed. To reduce the amount of fuel needed to run APU 14 at idle or to keep APU 14 spooled up, power can be transferred from primary engine 12 to APU 14 when primary engine 12 is operating at high power. In this configuration, power assist system 10 is operated in reverse with high pressure spool 18 on primary engine 12 driving a combined motor-generator. Generator 36 provides electric power to motor 38, which in turn drives shaft 32 of APU 14. Such power transfer can reduce the idle fuel burn of APU 14, such that APU 14 can remain on during flight and ready to respond on demand while reducing fuel usage, or keep APU 14 spooled up to reduce reaction time at start-up. In alternative embodiments, boosting power to secondary engine 14 can be supplied by the low spool of primary engine 12 through separate power linkage (not shown).

Figure 2:
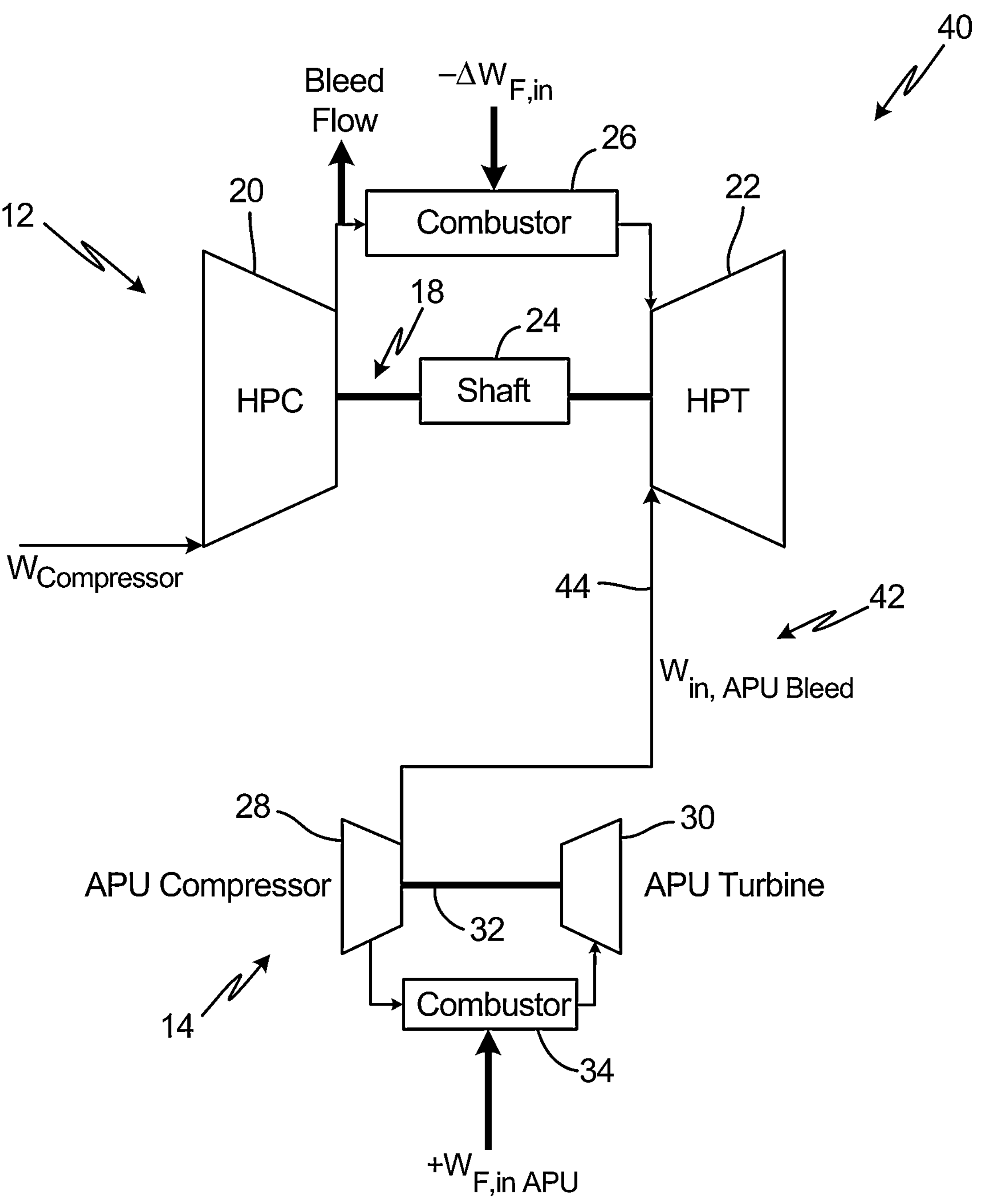
FIG. 2 is a schematic diagram of another embodiment of a gas turbine engine power assist system in which the secondary gas turbine engine boosts power to the primary gas turbine engine through a power linkage, which provides compressed air from the secondary gas turbine engine to a high pressure turbine of the primary gas turbine engine.

FIG. 2 is a schematic diagram of an alternative embodiment of a gas turbine engine power assist system 40 in which secondary gas turbine engine 14 provides compressed air to primary gas turbine engine 12. Power assist system 40 is identical to power assist system 10 with the exception of the power linkage. Power assist system 40 replaces electrical/mechanical linkage 16 with a mechanical power linkage 42. Power linkage 42 includes bleed air conduit 44, which connects compressor 28 of secondary engine 14 to HPT 22 of primary engine 10. Compressed bleed air from compressor 28 is provided directly into HPT 22 to provide torque to high pressure spool 18 and thereby boost power to primary engine 12 to maintain pressurization and operation at a reduced fuel flow ($-\Delta W_{F,\ in}$). Although fuel input ($+W_{F,\ in\ APU}$) is required to operate secondary engine 14, a net fuel savings can still be realized using power assist system 40. In addition, the capability for bleeding off compressor air from secondary engine 14 could facilitate operation of secondary engine 14 in certain operating conditions, as such architecture allows for rematching each participating engine 12, 14 in the power assist system. Many APU configurations operate a load compressor separate from the cycle compressor 28 shown, which could alternatively provide a source of bleed air. As previously discussed, secondary engine 14 is not limited to the embodiment shown. It will be understood by one of ordinary skill in the art that the source of bleed air can vary depending on the configuration of the APU.

Figure 3:
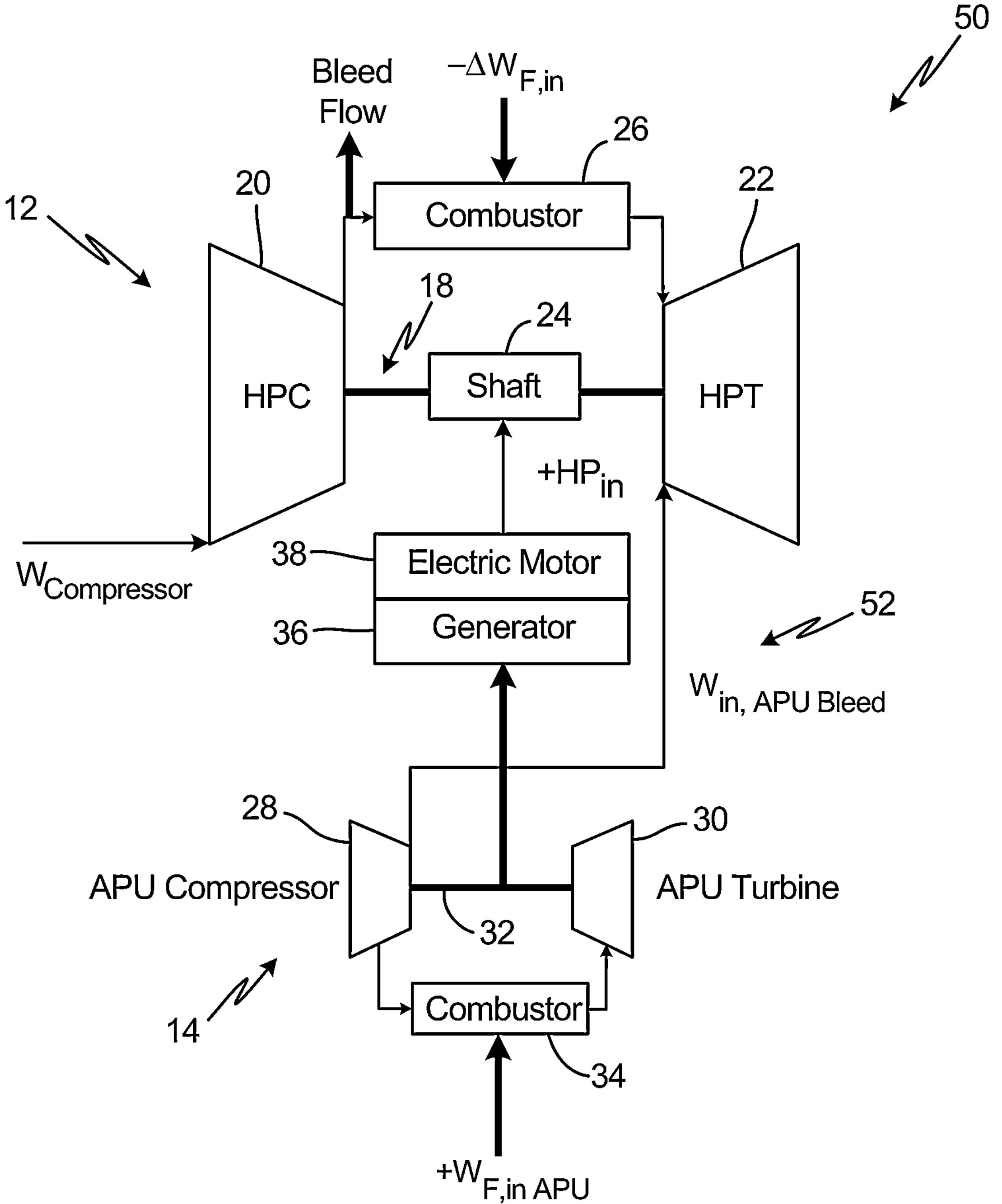
FIG. 3 is yet another embodiment of a gas turbine engine power assist system in which the secondary gas turbine engine boosts power to the primary gas turbine engine through the power linkages of FIGS. 1 and 2.

FIG. 3 is an alternative embodiment of a gas turbine engine power assist system 50 in which secondary gas turbine engine 14 supplements power to primary gas turbine engine 12 by providing compressed air to HPT 22 and by driving shaft 18 via generator 36 and motor 38. Power assist system 50 is identical to power assist systems 10 and 40 with the exception of the power linkage. Power assist system 50 includes power linkage 52, which is a combination of power linkage 16 and power linkage 42. Power linkage 52 can simultaneously deliver compressed air to HPT 22 to provide high spool torque while also driving shaft 18 via generator 36/motor 38. Additional benefit may be realized by combining the supplemental power provided by compressed air with rotational power provided by generator 36/motor 38 in some operations. Both power linkages influence the operating line on HPC 20. While the addition of compressed air into HPT 22 can have an adverse impact on the operating line, the rotational energy provided by motor 38 can have a positive impact on the operating line. Therefore, a balance between the two may provide a more efficient power boost to primary engine 12.

Figure 4:
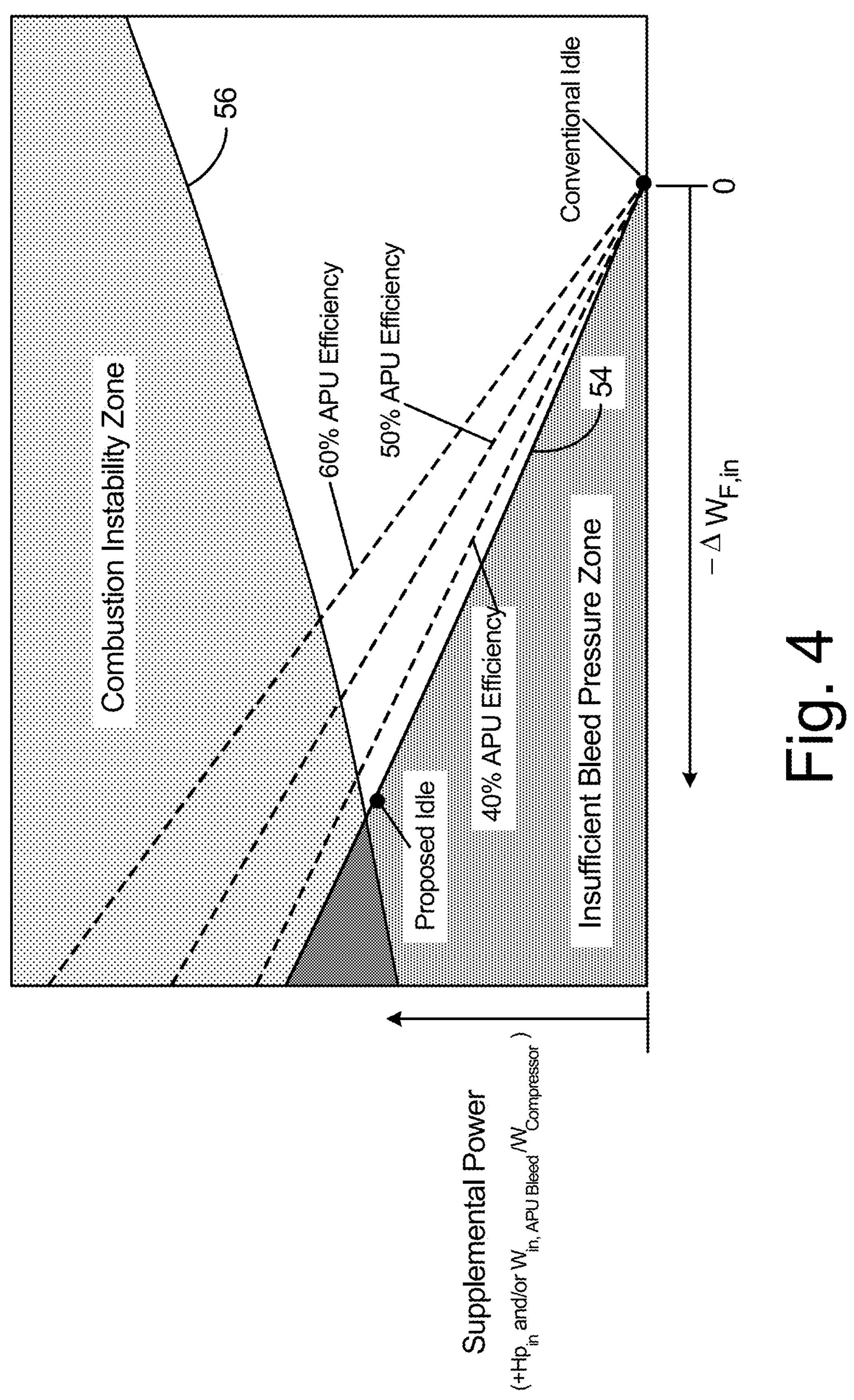
FIG. 4 is a graphical representation of fuel flow reduction to the primary gas turbine engine with power boost to the primary gas turbine engine provided by the secondary gas turbine engine.
Figure 5:
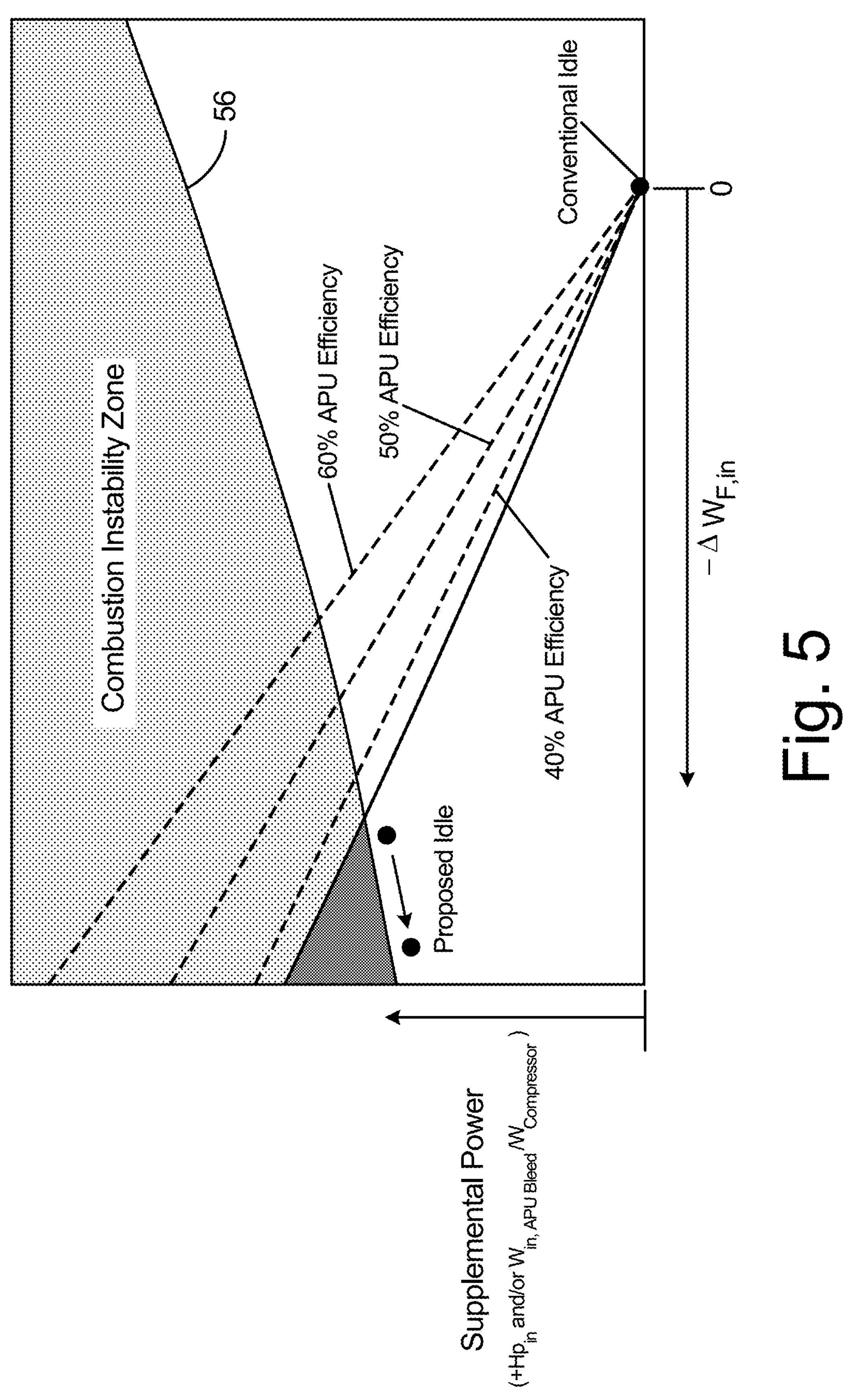
FIG. 5 is a graphical representation of improved fuel flow reduction over FIG. 4 obtainable when environmental control system requirements of the primary gas turbine engine are removed.
Figure 6:
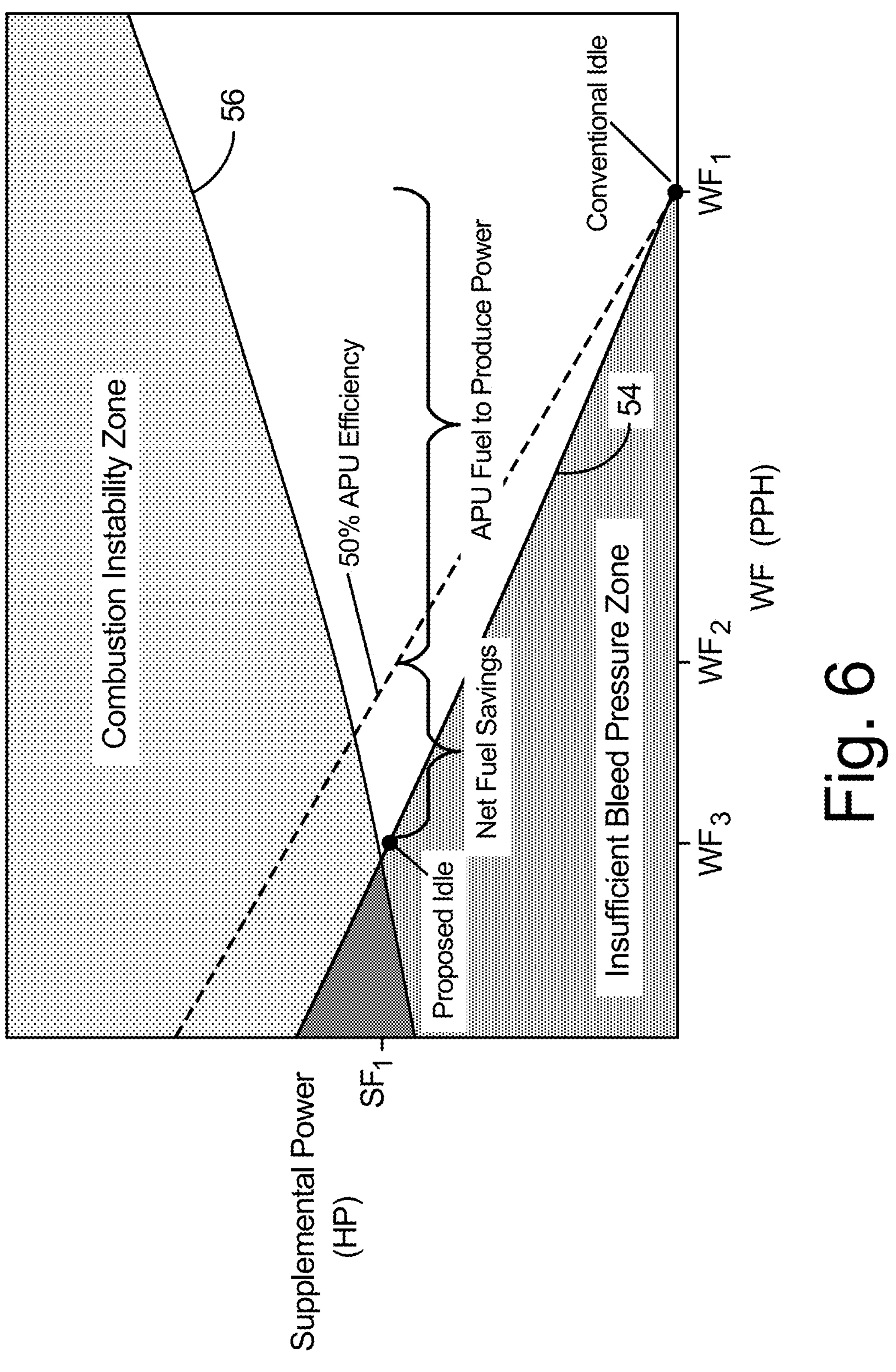
FIG. 6 is a graphical representation of net fuel reduction with power supplementation to the primary gas turbine engine, accounting for fuel needed to generate supplemental power.

FIGS. 4-6 provide graphical representations of fuel flow reduction using power assist systems 10, 40, and/or 50. FIG. 4 illustrates the effect of supplementing power to primary engine 12 using any of the power assist systems 10, 40, or 50. FIG. 4 shows ability to reduce fuel flow to primary engine 12 as compared to fuel flow at conventional idle ($-\Delta W_{F,\ in}$) by increasing horsepower ($+HP_{in}$) provided by secondary engine 14 via generator 36/motor 38 and/or increasing high spool torque provided by secondary engine 14 via compressed air from compressor 28 (shown as ratio of bleed air from compressor 28 to airflow entering compressor 20, $W_{in,\ APU\ Bleed}/W_{Compressor}$). The conventional gas turbine idle point is the nominal fuel flow a gas turbine would operate at without boosting from secondary engine 14.

FIG. 4 is a graphical representation of fuel flow reduction to the primary gas turbine engine with power boost to the primary gas turbine engine provided by the secondary gas turbine engine. FIG. 4 illustrates a conventional gas turbine engine idle point, in which the core supplies pressurized bleed air for the aircraft ECS (e.g., passenger cabin air). As fuel flow to primary engine 12 is reduced, supplemental power must be provided to maintain minimum bleed air pressurization, identified by line 54. Insufficient supplemental power, i.e., anything below line 54 falls within an Insufficient Bleed Pressure Zone for the aircraft ECS. Additionally, supplemental power provided to primary engine 12 relative to fuel flow into primary engine 12 must fall below a lean blowout (LBO) limit or a Combustion Instability Zone, identified by line 56. Excessive supplemental power, i.e., anything above line 56, falls within the Combustion Instability Zone in which a fuel-to-air ratio is reduced enough to cause the combustor flame to become unstable or extinguished. In other words, excessive supplemental power combined with excessive reduction in primary engine 12 fuel flow ($-\Delta W_{F,\ in}$) can reduce combustor 26 fuel-to-air ratio below sustainable combustion. The proposed idle location using power assist systems 10, 40, 50 can lie near the intersection of combustion instability zone line 56 and the minimum bleed air pressurization line 54, preferably providing a safety margin between the proposed idle location and line 56. In some embodiments, the proposed idle location is preferably on or near the minimum bleed air pressurization line 54 to avoid using fuel and supplemental power to pressurize air above what is required.

The relationship between fuel flow and supplemental power provided to primary gas turbine engine 12 will vary for each power assist system 10, 40, 50. The graph of FIG. 4 is intended to provide a simplified example of the power assist used during a descent idle mode as disclosed herein. It will be understood by one of ordinary skill in the art that modeling will be required for each power assist system 10, 40, 50, which can include variations in primary and secondary engines 12, 14 and power linkages 16, 42, 52, to identify an ideal fuel/supplemental power input combination. Furthermore, it will be understood that models will look different depending on the mode of operation (i.e., flight idle or ground idle). While the present disclosure provides power assist systems which can result in a net reduction of fuel consumption, the goal of the power assist system is not necessarily to obtain a reduction in fuel flow, but to improve readiness or response time of primary engine 12 in the event that additional thrust output is necessary. In some embodiments, power assist system 10, 40, 50 may be used to boost spool speed or reduce acceleration time without producing a net fuel flow reduction.

Additional configurations may be considered in optimization of power assist systems 10, 40, 50. For instance, an increased benefit may be realized by rescheduling HPC vanes when power supplement is available. In some embodiments, vanes of HPC 20 may be used to restrict airflow to shift Combustion Instability Zone line 56. The incidence angles of the HPC vanes can be changed to allow more or less airflow depending on the speed of high pressure spool 18. As the vanes are closed, airflow from HPC 20 can be reduced, which allows for an additional reduction in primary engine 12 fuel flow before reaching the LBO limit. By restricting airflow from HPC 20, the fuel-to-air ratio can be adjusted to optimize operation of power assist systems 10, 40, 50.

The efficiency of secondary engine 14 can also significantly impact the potential for net fuel savings achieved by power assist systems 10, 40, 50. FIG. 4 includes varying APU 14 efficiency lines. As will be discussed further with respect to FIG. 6, net fuel savings are dependent in part on the fuel efficiency at which APU 14 operates. Along the APU efficiency line, power assist systems 10, 40, and 50 are energy neutral (i.e., the amount fuel ($+\Delta W_{F,\ in\ APU}$) needed to generate supplemental power is balanced by the amount by fuel reduction ($-\Delta W_{F,\ in}$) to primary engine 12). Net fuel savings are only achieved to the left of each APU efficiency line, with greater fuel savings realized the farther left the idle position is located from the APU efficiency line. As illustrated in FIG. 4, the proposed idle location would result in a slight net fuel savings with supplemental power provided by secondary engine 14 operating at 40% efficiency, and improved net fuel savings with secondary engines 14 operating at 50% and 60% efficiency.

FIG. 5 is a graphical representation of improved fuel reduction obtainable when aircraft ECS requirements of primary engine 12 are removed. In some embodiments, pressurized air for the aircraft ECS can be supplied by a source of airflow other than the core or primary engine 12. Therefore, there is no requirement for primary engine 12 to supply pressurized bleed air for the aircraft ECS. In such embodiments, the idle location can be moved further to the left in fuel flow to a new proposed idle operation as there is no requirement to meet a minimum bleed air pressurization. Supplemental power provided to primary engine 12 relative to fuel flow into primary engine 12 must fall below the Combustion Instability Zone line 56, and sufficient supplemental power (e.g., $+HP_{in}$) is still provided by secondary engine 14 to maintain an ideal idle speed as necessary to reduce the time primary engine 12 takes to spool up if additional thrust is needed.

FIG. 6 is a graphical representation of an example of net fuel reduction with power supplementation to the primary gas turbine engine during descent of the aircraft, accounting for secondary engine 14 fuel needed to generate supplemental power and primary engine 12 fuel. FIG. 6 represents model results for power assist system 10 for particular models of a turbofan engine 12 and APU 14. As illustrated in FIG. 6, for APU 14 operating at 50% efficiency a power input of $SF_1$ would require a fuel reduction of approximately $WF_{1\text{-}2}$ (reduction from $WF_1$ to $WF_2$) fuel flow to primary engine 12 to be energy neutral, as indicated by the 50% APU energy efficiency. The reduction of $WF_{1\text{-}2}$ accounts for the amount of fuel needed by APU 14 to produce supplemental power for primary engine 12. Any further reduction of fuel flow to primary engine 12 results in a net fuel savings of $WF_{2\text{-}3}$ (reduction from $WF_2$ to $WF_3$) as indicated in FIG. 6. This is a reduction of about five percent in net fuel consumption, with a reduction of fuel flow to primary engine 12 of greater than ten percent over a conventional idle mode in which power to primary engine 12 is not boosted by secondary engine 14. As previously discussed, the net fuel savings is dependent on the efficiency of APU 14 with lower APU efficiencies resulting in lower net fuel savings.

In some embodiments, net fuel flow may be unchanged or even increased depending on the system configuration and goal of operation. The primary goal of using power assist systems 10, 40, and 50 can be to improve readiness or response time of primary engine 12 in the event that additional thrust output is necessary. While use of power assist systems 10, 40, and 50 as disclosed can result in a net reduction in fuel flow, in some embodiments, power assist systems 10, 40, 50 may be used to boost spool speed or reduce acceleration time without producing a reduction in net fuel flow. Using power assist system 50, a method of improving response time of primary engine 12 can include increasing supplementary horsepower ($+HP_{in}$) to primary engine 12 via power linkage 16 and reducing a bleed flow ratio of bleed air from compressor 28 to airflow entering compressor 20, $W_{in,\ APU\ Bleed}/W_{Compressor}$ via power linkage 42 in a controlled time variant manner concurrent with an increase in combustor 26 fuel flow ($+\Delta W_{F,\ in}$) in primary engine 12.

Power assist systems 10, 40, and 50 provide the capability for reducing fuel requirements of primary engine 12 during an idle mode of operation, and particularly, during descent of the aircraft. A net fuel savings can be realized by supplementing power to high pressure spool 18 via generator 36/motor 38 driven by secondary engine 14 and/or compressed bleed air from secondary engine compressor 28. In addition, supplemental power provided to primary engine 12 can increase the idle speed above the conventional idle speed providing safer engine operating conditions (i.e., improved compressor 20 operating stability margin) and reduced spool up time should additional thrust output by primary engine 12 be necessary. Power assist system 10 provides the additional benefit of being capable of operating in reverse, transferring power from primary engine 12 to secondary engine 14 to improve secondary engine 14 efficiency, such that the secondary engine 14 can remain on during flight and available for service as needed.

Discussion of Possible Embodiments

The following are non-exclusive descriptions of possible embodiments of the present invention.

A method of operating an aircraft hybrid gas turbofan during an idle mode of operation includes reducing a fuel flow to a primary gas turbine engine and boosting a high spool of the primary gas turbine engine using a secondary gas turbine engine via a first power linkage connecting the primary and secondary gas turbine engines, such that a net fuel reduction is achieved. The net fuel reduction accounts for fuel flow to the primary gas turbine engine and fuel flow to the secondary gas turbine engine.

The method of the preceding paragraph can optionally include, additionally and/or alternatively, any one or more of the following features, configurations, additional components, and/or steps: rescheduling HPC vanes when power supplement is available; switching environmental control system (ECS) bleed and power sources; changing supplementary horsepower input to primary gas turbine engine and changing a bleed flow ratio of bleed air from the APU compressor to airflow entering primary gas turbine compressor in a controlled manner concurrent with changes in primary engine combustor fuel flow.

A further embodiment of the method, the primary gas turbine engine can be a propulsion engine and the secondary gas turbine engine can be an auxiliary power unit (APU).

A further embodiment of any of the foregoing methods, wherein boosting the high spool of the primary gas turbine engine can include driving a generator with the secondary gas turbine engine, coupling a motor to the high spool, and powering the motor via the generator.

A further embodiment of any of the foregoing methods, wherein boosting the high spool of the primary gas turbine engine can include generating compressed air with the secondary gas turbine engine, and providing the compressed air directly into a turbine of the high spool of the primary gas turbine engine to provide high spool torque.

A further embodiment of any of the foregoing methods, wherein boosting the high spool of the primary gas turbine engine can include driving a generator with the second engine, coupling a motor to the high spool, powering the motor via the generator, generating compressed air in the secondary gas turbine engine, providing the compressed air into the turbine of the high spool of the primary gas turbine engine to provide high spool torque.

A further embodiment of any of the foregoing methods, wherein the idle mode occurs during descent of the aircraft.

A further embodiment of any of the foregoing methods, wherein reducing the fuel flow to the primary gas turbine engine can include a reduction of fuel flow greater than 10 percent over a conventional idle mode in which power to the high spool of the primary gas turbine engine is not boosted by the secondary gas turbine engine.

A further embodiment of any of the foregoing methods, wherein boosting the high spool of the primary gas turbine engine can include providing supplemental power to the primary gas turbine engine in an amount greater than 100 horsepower.

A further embodiment of any of the foregoing methods can further include restricting an air flow exiting from a compressor section of the primary gas turbine engine.

In another aspect, a method of operating an aircraft hybrid gas turbofan includes providing supplemental power to either a primary gas turbine engine or a secondary gas turbine engine—the primary gas turbine engine being a propulsion engine and the secondary gas turbine engine being an auxiliary power unit (APU). Supplemental power is provided to the primary gas turbine engine by the APU, and supplemental power is provided to the APU by the primary gas turbine engine. The method further includes reducing a fuel flow to the primary gas turbine engine when supplemental power is provided to the primary gas turbine engine by the APU such that a net fuel reduction is achieved. The net fuel reduction accounts for fuel flow to the primary gas turbine engine and fuel flow to the APU.

The method of the preceding paragraph can optionally include, additionally and/or alternatively, any one or more of the following features, configurations, additional components, and/or steps: rescheduling HPC vanes when power supplement is available; switching environmental control system (ECS) bleed and power sources; changing supplementary horsepower input to primary gas turbine engine and changing a bleed flow ratio of bleed air from the APU compressor to airflow entering primary gas turbine compressor in a controlled manner concurrent with changes in fuel flow to the APU.

A further embodiment of the method, wherein providing supplemental power to the primary gas turbine engine occurs during an idle mode of operation of the aircraft, and wherein providing supplemental power can include boosting the high spool of a primary gas turbine engine using the secondary gas turbine engine via a first power linkage connecting the primary and secondary gas turbine engines.

A further embodiment of any of the foregoing methods, wherein boosting the high spool of the primary gas turbine engine can include at least one of a first power supplementation method and a second power supplementation method. The first power supplementation method includes driving a generator with the secondary gas turbine engine, coupling a motor to the high spool, and powering the motor via the generator. The second power supplementation method includes generating compressed air in the secondary gas turbine engine, and providing the compressed air directly into a turbine of the high spool of the primary gas turbine engine to provide high spool torque.

A further embodiment of any of the foregoing methods, wherein reducing the fuel flow to the primary gas turbine engine can include a reduction of fuel flow greater than 10 percent over a conventional idle mode in which power to the high spool of the primary gas turbine engine is not boosted by the secondary gas turbine engine.

A further embodiment of any of the foregoing methods, wherein boosting the high spool of the primary gas turbine engine can include supplementing power to the primary gas turbine engine in an amount greater than 100 horsepower.

A further embodiment of any of the foregoing methods, wherein providing supplemental power to the secondary gas turbine engine can include driving a generator with a high spool of the primary gas turbine engine, coupling a motor to a spool of the APU, and powering the motor via the generator.

A further embodiment of any of the foregoing methods, wherein the mode of operation is one of a takeoff mode, top of climb mode, or cruise mode.

In yet another aspect, a method of operating an aircraft hybrid gas turbofan includes providing supplemental power to a primary gas turbine engine from a secondary gas turbine engine—the primary gas turbine engine being a propulsion engine and the secondary gas turbine engine being an auxiliary power unit (APU)—and reducing a response time of the primary gas turbine engine for spooling up when additional thrust output is needed.

An aircraft hybrid gas turbofan includes a primary gas turbine engine, which is a propulsion engine having a high spool; a secondary gas turbine engine, which is an auxiliary power unit (APU); and a power linkage between the high spool of the primary gas turbine engine and the APU.

The aircraft hybrid gas turbofan of the preceding paragraph can optionally include, additionally and/or alternatively, any one or more of the following features, configurations and/or additional components: a combined motor-generator of the primary gas turbine engine and a combined motor-generator of the APU; a load compressor separate from the APU compressor-turbine; a power turbine mounted on a power shaft which is rotationally independent from APU turbine shaft; a combined motor-generator of the APU mounted on a power shaft which is rotationally independent from APU turbine shaft.

A further embodiment of the aircraft hybrid gas turbofan, wherein the power linkage can include an electrical coupling and/or a mechanical coupling. The electrical coupling includes a generator driven by the APU and a motor coupled to the high spool and powered by the generator. The mechanical coupling includes a bleed air conduit connecting a compressor section of the APU to a core gas path of a turbine of the high spool.

A further embodiment of any of the foregoing aircraft hybrid gas turbofans, wherein the power linkage includes a combined motor/generator configured to transfer power from a spool of the primary gas turbine engine to the APU.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of operating a gas turbine engine, the method comprising:

operating the gas turbine engine in an idle mode of operation, wherein the gas turbine engine comprises a high pressure spool comprising a high pressure compressor and a high pressure turbine, and a low pressure spool comprising a fan, a low pressure compressor, and a low pressure turbine, and wherein operating the gas turbine engine in the idle mode comprises:

providing supplemental power, from a secondary gas turbine engine, to the high pressure spool of the gas turbine engine via a first power linkage connecting the gas turbine engine and the secondary gas turbine engine, to cause the high pressure spool to rotate at a higher speed than a conventional idle speed of a conventional idle mode of operation in which the supplemental power is not provided;

reducing a fuel flow to the gas turbine engine over the conventional idle mode of operation;

generating compressed air in the secondary gas turbine engine;

routing the compressed air from the secondary gas turbine engine directly to the high-pressure turbine of the high pressure spool of the gas turbine engine; and concurrently increasing the supplemental power provided via the first power linkage, decreasing an amount of the compressed air routed from the secondary gas turbine engine directly to the high-pressure turbine, and increasing a fuel flow provided to a combustor of the gas turbine engine, and thereby reducing a response time of the gas turbine engine for spooling up.

2. The method of claim 1, wherein the gas turbine engine is a propulsion engine and the secondary gas turbine engine is an auxiliary power unit (APU).

3. The method of claim 1, wherein providing supplemental power to the high pressure spool of the gas turbine engine comprises:

driving a generator with the secondary gas turbine engine;

coupling a motor to the high pressure spool; and powering the motor via the generator.

4. The method of claim 1, wherein operating in the idle mode of operation results in a net fuel reduction, wherein the net fuel reduction accounts for the fuel flow to the gas turbine engine and fuel flow to the secondary gas turbine engine.

5. The method of claim 1, wherein reducing the fuel flow to the gas turbine engine comprises a reduction of fuel flow greater than 10 percent over the conventional idle mode of operation.

6. The method of claim 1 and further comprising adjusting a fuel-to-air ratio of the gas turbine engine during the idle mode of operation by restricting an air flow exiting a compressor section of the gas turbine engine.

7. A method of operating an aircraft hybrid gas turbofan, the method comprising:

operating a primary gas turbine engine in an idle mode of operation, operating in the idle mode comprising:

providing supplemental power, from a secondary gas turbine engine, to a high pressure spool of the primary gas turbine engine via a first power linkage connecting the high pressure spool of the primary gas turbine engine and the secondary gas turbine, and wherein the primary gas turbine engine further comprises a low pressure spool, the low pressure spool comprising a fan, a low pressure turbine, and a low pressure compressor, and wherein the high pressure spool comprises a high pressure turbine and a high pressure compressor; and wherein providing the supplemental power from the secondary gas turbine engine to the high pressure spool of the primary gas turbine engine further comprises:

generating compressed air with the secondary gas turbine engine;

routing the compressed air from the secondary gas turbine engine directly to the high-pressure turbine of the high pressure spool of the primary gas turbine engine; and concurrently increasing the supplemental power provided via the first power linkage, decreasing an amount of the compressed air routed from the secondary gas turbine engine directly to the high-pressure turbine, and increasing a fuel flow provided to a combustor of the primary gas turbine engine, and thereby reducing a response time of the primary gas turbine engine for spooling up; and wherein the primary gas turbine engine is a propulsion engine and the secondary gas turbine engine is an auxiliary gas turbine engine (APU).

8. The method of claim 7, wherein providing the supplemental power to the high pressure spool of the primary gas turbine engine via the first power linkage comprises:

driving a generator with the secondary gas turbine engine;

coupling a motor to the high pressure spool; and powering the motor via the generator.

9. The method of claim 8, wherein operating in the idle mode of operation results in a net fuel reduction, wherein the net fuel reduction accounts for fuel flow to the primary gas turbine engine and fuel flow to the secondary gas turbine engine.

10. The method of claim 9, and further comprising reducing a fuel flow to the primary gas turbine engine by more than 10 percent over the conventional idle mode.

11. The method of claim 7 and further comprising:

operating the primary engine in a high-power mode of operation, wherein operating in the high-power mode of operation comprises providing a second supplemental power to the secondary gas turbine engine, wherein providing the second supplemental power comprises:

driving a generator with a high spool of the high pressure spool of the primary gas turbine engine;

coupling a motor to a spool of the APU; and powering the motor via the generator.

12. The method of claim 11, wherein the high-power mode of operation is at least one of a takeoff mode, top of climb mode, or cruise mode.

* * * * *